Figure 3:
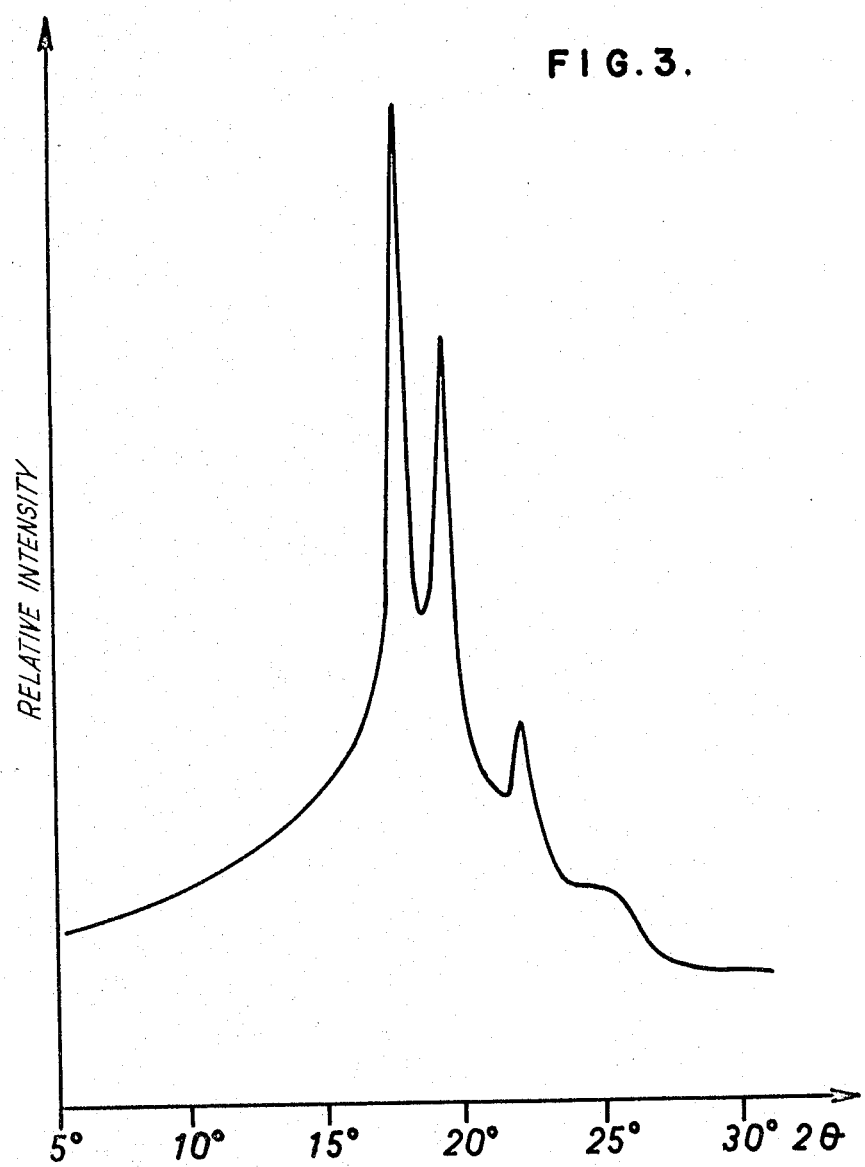

Jan. 31, 1967  G. NATTA ET AL  3,301,839
CRYSTALLINE 1,3-PENTADIENE POLYMERS CONTAINING
THE SYNDIOTACTIC CIS-1,4 STRUCTURE
Filed May 9, 1962  2 Sheets-Sheet 1
FIG. I.
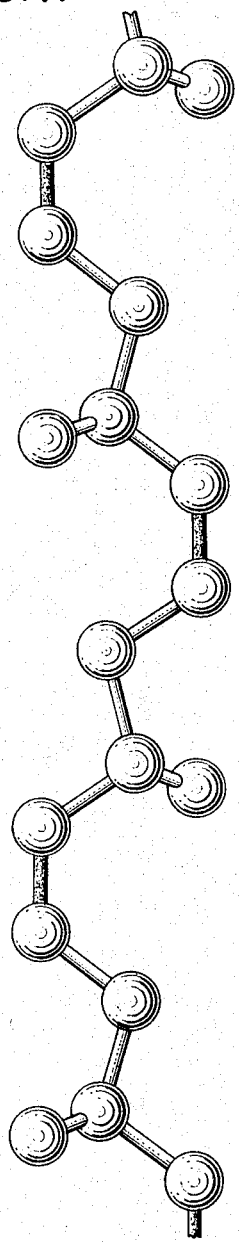
PORTION OF MAIN CHAIN OF CIS-1,4
POLYPENTADIENE HAVING ISOTACTIC
STRUCTURE
FIG. 2.
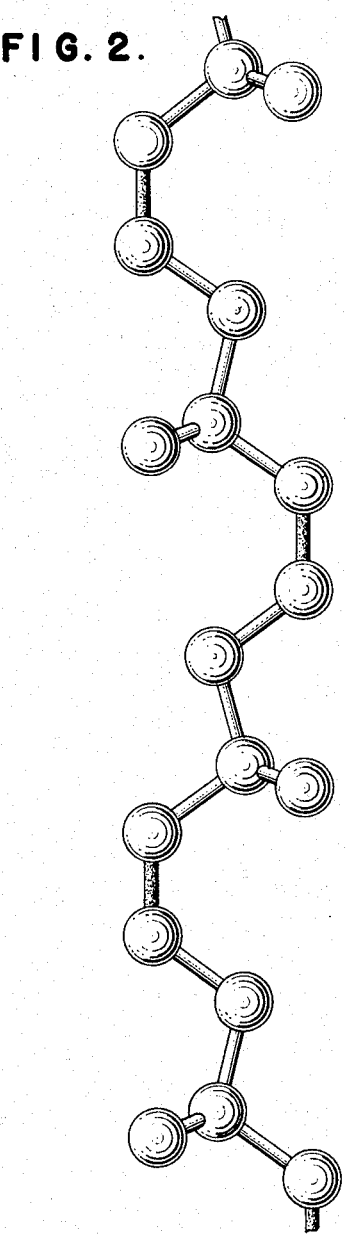
PORTION OF MAIN CHAIN OF CIS-1, 4- POLY-
PENTADIENE HAVING SYNDIOTACTIC STRUCTURE
*INVENTORS*
GIULIO NATTA
LIDO PORRI
ANTONIO CARBONARO
GIANFRANCO STOPPA GRAPH OF GEIGER COUNTER TRACING OF THE X—RAY DIAGRAM (Cu—Kα) OF CIS—1, 4 POLYPENTADIENE HAVING SYNDIOTACTIC STRUCTURE.

3,301,839
CRYSTALLINE 1,3-PENTADIENE POLYMERS CONTAINING THE SYNDIOTACTIC CIS-1,4 STRUCTURE
Giulio Natta, Lido Porri, Antonio Carbonaro, and Gianfranco Stoppa, Milan, Italy, assignors to Montecatini Edison S.p.A., Milan, Italy
Filed May 9, 1962, Ser. No. 193,528
Claims priority, application Italy, May 13, 1961, 8,869/61; Oct. 16, 1961, 18,693/61
19 Claims. (Cl. 260—94.2)

It is known that 1,3-pentadiene can be polymerized in various ways depending on whether the polymerization involves only one double bond or both conjugated double bonds.

In the first case there can be obtained either 1,2-monomeric units, if the polymerization involves the end double bond, or 3,4-units, if the polymerization involves the inner double bond.

In the second case, 1,4-units are obtained which can be either cis-1,4 or trans-1,4 depending on the configuration of the double bond.

While in the case of the polymerization of butadiene, only one trans-1,4 or cis-1,4 polymer can be obtained, with pentadiene there can be various polymers consisting only of trans-1,4 or only of cis-1,4 units, which polymers are different from each other since they have a different order in the configuration of tertiary carbon atoms of the chains. There can be, for example, trans-1,4 polypentadienes or cis-1,4 polypentadienes in which the distribution of the configurations of tertiary carbon atoms is either disorderly or in the form of stereoblocks.

It is an object of the present invention to provide cis-1,4-polymers of pentadiene having a syndiotactic structure.

A further object is to provide a process for preparing these polymers.

Another object is the production of certain vulcanized products obtained from or containing these polymers.

Further objects and advantages of the present invention will become hereinafter apparent.

We have surprisingly found that with the aid of suitable soluble catalysts, pentadiene can be polymerized to polymers having a high content of cis-1,4 units (comprised between 65 and 90%) and which have a syndiotactic disposition of tertiary carbon atom configurations.

Polymers of this type have not heretofore been described.

These polymers are demonstrated to be crystalline at room temperature and have a melting temperature which varies according to the structural regularity of the chains.

The identity period of these polymers along the chain axis appears to be about 8.5 A., i.e., it is very close to that of cis-1,4 polybutadiene and contains 2 monomeric units. This identity period is consistent only with a syndiotactic distribution of the configurations of tertiary carbon atoms. For a structure of isotactic type with an identity period containing two monomeric units, this value should be about 8 A.

A representation of a hypothetical isotactic cis-1,4 polypentadiene chain, considered as laid on a theoretical plane, is shown in FIGURE 1 of the accompanying drawings.

The structure of syndiotactic cis-1,4 polypentadiene is reported in FIGURE 2.

From the representations, it is evident that the two polymers are different due to a different steric disposition of methyl groups. In the case of the hypothetical isotactic polymers, the methyl groups are all on the same side of the theoretical plane at least for long stretches of the main chain; while in the case of the syndiotactic polymer, they are alternatively on one or on the other side.

FIGURE 3 shows a graph of Geiger counter tracing of the X-ray diagram (Cu-K$\alpha$) of a polypentadiene of the present invention. In this graph the relative intensity is shown on the ordinate axis and the values for angle $2\theta$ are shown on the abscissa.

Syndiotactic cis-1,4 polypentadiene can be prepared, according to the present invention, with the aid of catalysts obtained by reacting a hydrocarbon soluble cobalt compound or a hydrocarbon soluble nickel compound with a mono alkyl aluminum dichloride (in which the alkyl groups contain 1 to 15 carbon atoms) complexed with an electron-donor substance of the Lewis base type.

As complexing agent, a pyridic base (e.g., pyridine or isoquinoline), thiophene, furane or, in general, organic compounds containing nitrogen, sulphur or oxygen can be used.

The molar ratio between the aluminum compound and complexing agent is, in general, between about 1:0.1 and about 1:10. The molar ratio between aluminum compound and complexing agent varies, however, depending on the complexing agent used. For example, when using a pyridic base or oxygen-containing compound this ratio can vary from about 1:0.1 to about 1:0.99, preferably from about 1:0.5 to about 1:0.9; while with thiophene this ratio varies from about 1:0.1 to about 1:10, preferably for economical reasons, from about 1:05 to about 1:2.

The complexed alkyl aluminum dichloride can be used with practically any soluble cobalt or nickel compound or complex to obtain catalysts suitable for preparing syndiotactic cis-1,4 polypentadiene. Among these cobalt and nickel compounds or complexes there can be mentioned cobalt and nickel acetylacetonates, cobalt and nickel salts of organic acids such as butyrates, stearates, ethylhexanoates, and complexes of cobalt and nickel halides with Lewis bases in general, such as furane tetrahydrofurane, pyridine, thiophene, diethylether, diethyl sulphide, trialkylamines, etc.

In the preparation of the catalyst according to the present invention, the Al/Co or Al/Ni ratio can be varied within very wide limits, e.g., from 1 to above 1000.

The catalyst can be prepared before the addition of the monomer, for instance by the reaction between a solution of complexed monoalkylaluminum dichloride and a cobalt or nickel compound solution.

An alternative procedure consists of preparing the catalyst in the presence of the monomer, for example, by adding the monoalkyl aluminum dichloride to a hydrocarbon solution containing the cobalt or nickel compound or complex, the pentadiene and the alkyl aluminum dihalide complex in the aforementioned ratios, or by adding the cobalt or nickel compound, preferably in solution, to a solution containing the monomer and the complexed alkyl aluminum dichloride.

The temperature range in which the polymerization can be carried out is from approximately $-100°$ C. to about $+100°$ C., preferably from $-30°$ C. to $+30°$ C.

As polymerization solvent, any hydrocarbon solvent, preferably an aromatic or a mixture of aromatic and aliphatic hydrocarbons, can be used. The polymerization can also be carried out in the absence of extraneous solvents, by operating with the liquid monomer.

With the catalysts of the present invention, only the trans-isomer of pentadiene is polymerizable to the cis-1,4 polymer. However, it is not necessary to have available pure trans pentadiene since the commerically available mixtures of trans- and cis-isomers can also be used. In this case only the trans-isomer polymerizes, whereas the cis-isomer remains unaltered and can be recovered at the end of the polymerization, together with small proportions, if any, of unpolymerized trans-isomer. It is known that the cis-isomer can in turn be isomerized by various methods to give a mixture, containing about 85% of trans-isomer, which mixture can be used again in the polymerization.

The fact that the cis-isomer of pentadiene does not disturb the polymerization of the trans-isomer can be utilized, if so desired, to operate in the absence of a solvent. In this case, the cis-isomer itself can be used as the solvent.

The crude pentadiene polymerization products obtained with the said of Al(alkyl)Cl$_2$. complexing agent-cobalt compound catalysts, in general, do not have a cis-1,4 unit content higher than 80%, while those obtained using the corresponding nickel catalysts have a cis-1,4 content in the order of 65 to 70%. In general, the polymers appear to contain different compositions of macromolecules, but the polymers always possess a high content of cis-1,4 units. The polymers, which are obtained by using Ni catalysts tend to have a lower molecular weight than those obtained when using Co catalysts.

We have also found that the macromolecules with a lower cis content can be removed from the crude product by repeated dissolution of the polymer in benzene and reprecipitation with methylethylketone. For instance, a crude polymer obtained with the [Al(C$_2$H$_5$)Cl$_2$.0.5 pyridine/cobalt diacetylacetonate] catalytic system and having a cis-1,4 unit content of 70%, after 4 successive dissolutions in benzene and 4 reprecipitations with methylethylketone reaches a cis content of above 85%.

This method of purifying the crude polymer is based on the fact that the solubility of the macromolecules when their molecular weight is not very different, varies with the steric purity; the less pure macromolecules being more soluble. For most uses the crude polypentadiene, obtained according to the process described above, can be used as it is, and recourse need be had to the aforementioned purification method only when products having a higher cis content are desired.

An interesting feature of the catalysts of the present invention is that by varying the particular complexing agent bound to the Al(alkyl)Cl$_2$, it is possible to vary within certain limits the stereoregularity and therefore the melting point of the crystalline cis-1,4 polypentadienes. For example, a polypentadiene obtained with the catalytic system [Al(C$_2$H$_5$)Cl$_2$.(0.5)C$_5$H$_6$N/cobalt diacetylacetonate] has a final melting temperature between 50° and 55° C., while a polypentadiene obtained with the system [Al(C$_2$H$_5$)Cl$_2$.(0.9)thiophene/cobalt diacetylacetonate], has a final melting temperature of about 40° C.

This fact is important from a practical point of view since for different applications, products having different melting temperatures may be preferred.

Syndiotactic cis-1,4 polypentadiene can be vulcanized by the methods normally used for preparing vulcanized products. In the case of polymers having a high melting point (>50° C.), the vulcanized products are rubbers, which are suitable for high temperature uses whereas in the case of polymers having a lower melting point, the vulcanized products are rubbers suitable for various uses at room temperature.

The vulcanized products obtained from the polypentadienes have very good mechanical properties even in the absence of reinforcing fillers, and a good rebound elasticity.

The good mechanical properties are ascribed to the fact that also in the vulcanized state the macromolecules, which are amorphous in the unstretched state, are capable of crystallizing under stretching conditions.

The analysis of the polypentadienes of the present invention is carried out by infrared spectrography. The polymer is examined in CS$_2$ solution (60–100 mg. of polymer in 10 ml. of solution). For determining the trans unsaturation, the band at 10.35 microns is utilized, sponds $10 \times 10^4$ as absorption coefficient, which corresponds to the average value given in the literature (see H. L. McMurray, V. Thornton, Anal. Chem. 24, 318 (1952)).

Unsaturation due to the vinyl group, which should have been revealed by a band at 11 microns, is absent. The unsaturation of cis type is determined by taking the difference between 100 and the trans unsaturation content.

The optical density of the band at 10.35 microns is read on a base line drawn between $10.08\mu$ and $10.55\mu$.

The percentage of trans unsaturation is calculated from the formula:

$$C_t\% = (D_{10.35} \times 68 \times 10)/(S \times P)$$

in which:
   $D_{10.35}$=optical density of the band at 10.35
   $S$=thickness of the cell (cm.)
   $P$=mg. of polymer dissolved in 10 ml. of solution.

The percentage of cis unsaturation is calculated by difference, i.e., from the expression:

$$C_{cis}\% = 100 - C_t\%$$

Other analysis methods can be employed for determining the cis-1,4 unit content of polypentadienes. The various other methods may give values which differ slightly from each other.

When giving the cis-1,4 unit content of a polypentadiene, it is therefore necessary to mention also the analytical method employed. For this reason we have described in detail the method used for the examination of the polypentadienes of the present invention.

The following examples are given to illustrate the invention.

Unless otherwise indicated, all parts and proportions are by weight.

*Example 1*

The following compounds are introduced into a 100-cc. glass reactor under dry nitrogen in the following order:

| | |
|---|---|
| Anhydrous benzene _____cc__ | 50 |
| Al(C$_2$H$_5$)Cl$_2$ _____cc__ | 0.9 |
| Thiophene _____cc__ | 0.3 |
| Cobalt diacetylacetonate _____g__ | 0.0026 |
| Pentadiene-1,3 (with 97–98% of trans-isomer) _____cc__ | 15 |

After polymerization for 10 hours at 0° C., the polymer is coagulated with an excess methanol, carefully washed with methanol and vacuum dried at room temperature.

7.8 g. of polypentadiene, which is demonstrated to be crystalline by X-ray examination and has a cis-1,4 unit content of about 75%, is obtained.

The polymer is dissolved in 100 cc. of benzene and is reprecipitated with an excess of methylethylketone. The product thus purified has a cis content of 82%. After a further dissolution in benzene and reprecipitation with methylethylketone, a product having the following characteristics is obtained:

| | |
|---|---|
| Cis-1,4 units _____ | 87%. |
| Vinyl bonds _____ | Absent. |
| Melting temperature (under the polarizing microscope) _____ | 42° C. |
| Intrinsic viscosity (determined in toluene at 30° C.) _____ | 3.5 (100 cc./g.). |

The product is shown to be crystalline by X-ray examination and gives the spectrum (registered with a Geiger counter (CuKα)), reported in FIGURE 3. Further treatments with benzene and methylethylketone, such as indicated above, do not cause any variation in the characteristics of the product.

*Example 2*

By operating according to the procedure of the preceding example, the following compounds are used:

| | cc. |
|---|---|
| Anhydrous benzene | 70 |
| Al($C_2H_5$)$Cl_2$ | 1.05 |
| Anhydrous pyridine | 0.49 |
| Cobalt diacetylacetonate | 0.0028 |
| Pentadiene (98% trans-isomer) | 15 |

After polymerization for 12 hours at 0° C., methanol is introduced and the polymer is coagulated with the same solvent. After drying, 8.5 g. of polypentadiene having a cis-1,4 unit content of 72% are obtained.

The product is shown to be crystalline by X-ray examination and presents a spectrum similar to that shown in FIGURE 3.

The product is then purified by successive dissolutions in benzene and reprecipitations with methylethylketone. After 4 treatments of this type, a crystalline product having the following characteristics is obtained:

Infrared analysis:
  Cis-1,4 units _____ 90%.
  3,4 units _____ —
  Trans double bonds _____ 10%.
  Melting temperature (under the polarizing microscope) _____ 52° C.
  Intrinsic viscosity (in toluene at 30° C.) _____ 2.72 (100 cc./g.).

Upon operating as described above, but using the cis-isomer of pentadiene as the monomer, no polymer is obtained.

*Example 3*

The following substances are introduced into a 100 cc. glass reactor:

| | | |
|---|---|---|
| Anhydrous benzene | cc__ | .60 |
| Al($C_2H_5$)$Cl_2$ | cc__ | 1 |
| Thiophene | cc__ | 0.33 |
| Cobalt stearate | g__ | 0.026 |
| Pentadiene-1,3 (containing 96% of trans-isomer and 3.9% of cis-isomers) | cc__ | 16 |

The polymerization is carried out at 18° C. for 5 hours. The polymer is then coagulated with methanol, carefully washed with methanol and finally dried under vacuum.

8.7 g. of a solid polymer, which possesses a crystallinity under X-ray examination similar to the polymers of the preceding examples, has an intrinsic viscosity (in toluene at 30° C.) of 2.86 (100 cc./g.) and upon infrared examination is shown to have a cis content of 79%, are obtained.

*Example 4*

By operating as in Example 3, but using, instead of cobalt stearate, an equimolar amount of cobalt 2-ethylhexanoate, a polymer possessing the same characteristics is obtained.

*Example 5*

By operating as described in Example 1, but using, instead of thiophene, an equimolar amount of isoquinoline, syndiotactic cis-1,4 polypentadiene having a cis-1,4 unit content of about 74% is obtained.

*Example 6*

The following compounds are introduced into a 50 cc. glass reactor while operating under nitrogen:

| | | |
|---|---|---|
| Anhydrous benzene | cc__ | 25 |
| Al($C_2H_5$)$Cl_2$ | cc__ | 0.6 |
| Thiophene | cc__ | 0.8 |
| Colbalt diacetylacetonate | g__ | 0.002 |
| Pentadiene-1,3 (98% of trans-isomer) | cc__ | 8.0 |

The polymerization is carried out at 20° C. for 5 hours. There is obtained 5.5 g. of crystalline syndiotactic polypentadiene, having a cis-1,4 content of about 81%.

*Example 7*

100 parts by weight of syndiotactic cis-1,4 polypentadiene, obtained according to Example 1, are mixed in a roll mixer with the following ingredients (all parts by weight):

| | Parts |
|---|---|
| Phenyl β-naphthylamine | 1.0 |
| Laurylic acid | 2.0 |
| Zinc oxide | 5.0 |
| Vulcafor HBS [1] | 1.8 |
| Sulfasan R [2] | 2.2 |

[1] Cyclohexylbenzothiazylsulphamide, a product of I.C.I.
[2] Morpholine disulphide, a product of Monsanto Chemical Co.

The mix thus obtained is vulcanized in a press at 150° C. for 40 minutes. The vulcanized product has the following characteristics.

| | | |
|---|---|---|
| Tensile strength | kg./cm.$^2$__ | 135 |
| Elongation at break | percent__ | 800 |
| Modulus at 300% | kg./cm.$^2$__ | 14 |
| Shore A hardness | | 47 |
| Rebound elasticity at 20° C. | percent__ | 70 |

*Example 8*

A 100 cc. test tube provided with a side inlet for applying vacuum and introducing nitrogen is used as reactor.

Into this test tube, from which air has been removed and replaced with pure nitrogen, the following substances are introduced in the following order:

| | cc. |
|---|---|
| Anhydrous benzene | 40 |
| Monoethyl aluminum dichloride | 0.2 |
| Thiophene | 0.12 |
| 1,3-pentadiene (98% trans-isomer and 2% cis-isomer) | 10 |

5.47 mg. of nickel diacetylacetonate dissolved in 2.5 cc. of benzene are then added to the homogenized mixture.

After 8 hours at 25° C., the polymerization is stopped by the addition of methanol and the polymer is carefully coagulated with methanol.

5.5 g. of polymer, which by infrared analysis is demonstrated to have a content of 64% cis-1,4 units, are obtained.

The polymer is dissolved in 15 cc. of benzene and reprecipitated again with an excess of methylethylketone. This reprecipitated polymer is analyzed as follows:

Infrared analysis: 79% of cis-1,4 units.
X-ray analysis: crystalline, the X-ray spectrum appears identical with that described for the polymers of the preceding examples.
Intrinsic viscosity: 0.46 (100 cc./g.) (in toluene at 30° C.).
Melting point: 37° C. (determined under the polarizing microscope).

*Example 9*

The same procedure as that of Example 8 is followed, but 0.2 cc. of thiophene is used instead of 0.12 cc.

The product thus obtained has the same characteristics as that of the product in Example 8.

*Examples 10 to 13*

The same procedure is followed as that of Example 8, but monoethyl aluminum dichloride is substituted for by the following substances respectively: monopropyl aluminum dichloride, monoisobutyl aluminum dichloride, monohexyl aluminum dichloride and monododecyl aluminum dichloride. The product obtained with each of these aluminum compounds has the same characteristics as polymer product of Example 8.

Example 14

Operating as in Example 8, the following substances are used:

|  | cc. |
|---|---|
| Benzene | 50 |
| Monoethyl aluminum dichloride | 0.4 |
| Anhydrous pyridine | 0.15 |
| 1,3-pentadiene (99% trans-isomer) | 15 |

6 mg. of nickel diacetylacetonate dissolved in 4 cc. of benzene are added to the homogenized mixture.

The whole mass is kept at 25° C. for 10 hours.

7.6 g. of polymer with a content of cis-1,4 units of 65% are obtained. The polymer is purified by dissolution in as small an amount as possible of benzene and by reprecipitation with methylethylketone. This dissolution and reprecipitation is repeated three times.

The purified polymer has the following characteristics:

| Content of cis-1,4 units | percent | 80 |
|---|---|---|
| [$\eta$] (in toluene at 30° C.) | 100 cc./g. | 0.5 |

The polymer is crystalline, under X-ray examination, in the same way as the product of Example 8.

Examples 15 to 18

The same procedure as that of Example 8 is followed, but, instead of nickel diacetyl acetonate, equimolecular amounts of one of the following compounds are used respectively: $NiCl_2$-pyridine complex, nickel stearate; $NiCl_2$-triphenylphosphine, $NiCl_2$-triphenyl stibine. The polymer product thus obtained has the same characteristics as the product obtained in Example 8.

Example 19

Operating as in the preceding Examples 15–18, the following compounds are used:

|  | cc. |
|---|---|
| Anhydrous benzene | 70 |
| $Al(C_2H_5)Cl_2$ | 0.26 |
| Anhydrous pyridine | 0.12 |
| Cobalt diacetylacetonate | 0.0028 |
| Pentadiene (98% trans-isomer) | 15 |

After polymerization for 12 hours at 0° C., methanol is introduced and the polymer is coagulated with the same solvent. After drying, 6 g. of a crude polypentadiene, having a cis-1,4 unit content of 70%, are obtained.

The product is demonstrated to be crystalline by X-ray examination and presents a spectrum similar to that shown in FIGURE 3.

The polymer is purified by successive dissolution in benzene and reprecipitations with methylethylketone. After three treatments of this type, a crystalline product having a cis-1,4 content of 86% (determined by infrared analysis) is obtained.

Example 20

By operating as in Example 3, the following compounds were used:

| Anhydrous toluene | cc. | 60 |
|---|---|---|
| Aluminum monoethyldichloride | cc. | 0.24 |
| Thiophene | cc. | 0.1 |
| Cobalt stearate | g. | 0.03 |
| Pentadiene-1,3 (95% transisomer, 5% cis isomer) | cc. | 14 |

After polymerization for 15 hours at 0° C., 6 g. of crude polypentadiene having a cis-1,4 unit content of 75% are obtained.

Example 21

This example is carried out by operating as in Example 1, but using, instead of $Al(C_2H_5)Cl_2$, an equimolar amount of aluminum isobutyl dichloride.

A syndiotactic cis-1,4 polypentadiene having the same characteristics as the polymer of Example 1 is obtained.

Many variations and modifications can, of course, be practiced without departing from the spirit and scope of the present invention.

Having thus described the present invention, what it is desired to secure and claim by Letters Patent is:

1. A linear homopolymer of pentadiene having a content of cis-1,4 units above 65%, a syndiotactic disposition of the tertiary carbon atoms and a crystalline structure in the solid state with an identity period of about 8.5 A. along the chain axis.

2. A linear homopolymer of pentadiene according to claim 1, having a content of cis-1,4 units higher than 85%.

3. A process for preparing the linear homopolymer of pentadiene of claim 1, which comprises polymerizing 1,3-pentadiene in the presence of a catalyst obtained by the reaction of
   (1) a metal compound selected from the group consisting of hydrocarbon-soluble cobalt compounds and hydrocarbon-soluble nickel compounds with
   (2) an alkyl aluminum dichloride complexed with a Lewis base type organic electron-donor substance selected from the group consisting of pyridine, isoquinoline, thiophene, and furane.

4. A process according to claim 3, wherein the metal compound is an acetylacetonate.

5. A process according to claim 3, wherein the transisomer is used as the 1,3-pentadiene monomer.

6. A process according to claim 3, wherein a mixture of the cis and trans-isomer is used as the 1,3-pentadiene monomer.

7. A process according to claim 3, wherein the molar ratio of said alkyl aluminum dichloride to said Lewis base type electron-donor substance is from about 1:0.1 to about 1:10.

8. A process according to claim 3, wherein the molar ratio of said alkyl aluminum dichloride compound to said metal compound is from about 1 to 1000.

9. A process according to claim 3, wherein the polymerization is carried out at a temperature of from −100° to +100° C.

10. A process according to claim 9, wherein the temperature is from −30° to +30° C.

11. A process according to claim 3, wherein the polymerization is carried out in the presence of a hydrocarbon solvent.

12. A process according to claim 3, wherein the polymerization is carried out in absence of an extraneous solvent by using the liquid monomer as the solvent.

13. The process according to claim 12, wherein the cis-isomer of pentadiene is used as the solvent.

14. A process according to claim 3, wherein the cis content of crude polypentadiene product is enriched and the sterically less pure macromolecules are separated therefrom by solvent dissolution and reprecipitation of said crude polymer.

15. A process according to claim 3, wherein the metal compound is an alkoxide.

16. A process according to claim 3, wherein the metal compound is a salt of an organic acid.

17. A process according to claim 3, wherein the metal compound is a complex of a halide of the metal with a Lewis type base selected from the group consisting of furane, tetrahydrofurane, pyridine, thiophene, diethyl ether, diethyl sulphide and trialkylamines.

18. A vulcanizate of a linear homopolymer of pentadiene according to claim 1.

19. Vulcanized products of claim 18 which are substantially amorphous in the non-stretched state and crystallize under stretching even at temperatures above room temperature.

References Cited by the Examiner

UNITED STATES PATENTS

| | | | |
|---|---|---|---|
| 3,020,269 | 2/1962 | Leonard | 260—94.3 |
| 3,040,016 | 6/1962 | Balas et al. | 260—94.3 |
| 3,050,513 | 8/1962 | Zelinski et al. | 260—94.3 |
| 3,068,180 | 12/1962 | Amerongen | 260—94.3 |

FOREIGN PATENTS 213,051  1/1961  Austria.

OTHER REFERENCES

Natta et al., Isotactic Trans 1,4 Polymers of 1,3 Pentadiene Atti Accad, Lincei 29 (8), 257–264 (1960) article in vol. VII of A Collection of the Original Papers by Prof. Giulio Natta et al., TP156C35N37.

D'Ianni Rubber Chem. e. Tech., volume 34, No. 1 (April–June 1961) pages 361–377, pages 366, 368, 370 relied on.

JOSEPH L. SCHOFER, *Primary Examiner.*

JAMES A. SEIDLECK, *Examiner.*

E. J. SMITH, *Assistant Examiner.*